United States Patent [19]
Barborak et al.

[11] Patent Number: 5,516,739
[45] Date of Patent: May 14, 1996

[54] LATE TRANSITION METAL CATALYSTS FOR THE CO- AND TERPOLYMERIZATION OF OLEFIN AND ALKYNE MONOMERS WITH CARBON MONOXIDE

[75] Inventors: James C. Barborak, Jamestown; Maurice S. Brookhart, Chapel Hill, both of N.C.

[73] Assignees: The University of North Carolina at Chapel Hill, Chapel Hill; The University of North Carolina at Greensboro, Greensboro, both of N.C.

[21] Appl. No.: 158,164

[22] Filed: Nov. 24, 1993

Related U.S. Application Data

[63] Continuation of Ser. No. 827,681, Jan. 29, 1992, abandoned, which is a continuation-in-part of Ser. No. 513,241, Apr. 20, 1990, abandoned.

[51] Int. Cl.$^6$ .................................................. B01J 31/18
[52] U.S. Cl. ..................... 502/161; 502/152; 502/155; 502/156; 502/166; 502/229; 556/18; 556/136
[58] Field of Search ................................ 502/166, 161, 502/152, 155, 156, 229; 556/18, 136, 137, 146

[56] References Cited

U.S. PATENT DOCUMENTS

| | | | |
|---|---|---|---|
| 3,324,092 | 6/1967 | Naarmann et al. | 260/88.1 |
| 3,432,530 | 3/1969 | Mulheim | 260/429 |
| 3,454,538 | 7/1969 | Naarmann et al. | 260/78.5 |
| 3,497,488 | 2/1970 | Dawans et al. | 260/94.3 |
| 3,635,937 | 1/1972 | Bauer et al. | 260/94.9 C |
| 4,786,714 | 8/1988 | Drent | 528/392 |
| 4,788,279 | 11/1988 | Drent | 502/150 X |
| 4,791,180 | 12/1988 | Turner | 526/160 |
| 4,794,096 | 12/1988 | Ewen | 502/117 |
| 4,808,699 | 2/1989 | Van Broekhoven et al. | 528/392 |
| 4,874,736 | 10/1989 | Drent | 502/165 |
| 4,914,183 | 4/1990 | Geuze et al. | 528/392 |
| 4,925,918 | 5/1990 | Brown et al. | 502/150 X |
| 5,034,507 | 7/1991 | Smith | 528/392 |
| 5,055,552 | 10/1991 | Wong | 528/392 |
| 5,057,599 | 10/1991 | Wong | 528/392 |
| 5,059,676 | 10/1991 | Drent | 528/271 |
| 5,059,678 | 10/1991 | Van Broekhoven et al. | 502/150 X |
| 5,061,782 | 10/1991 | Drent | 528/271 |
| 5,064,802 | 12/1991 | Stevens et al. | 502/155 |
| 5,066,777 | 11/1991 | Van Leeuwen et al. | 502/155 X |
| 5,082,885 | 1/1992 | Kluttz et al. | 524/347 |
| 5,260,491 | 11/1993 | Wink et al. | 568/454 |

FOREIGN PATENT DOCUMENTS

| 0277003 | 8/1988 | European Pat. Off. . |
| 0277004 | 8/1988 | European Pat. Off. . |

OTHER PUBLICATIONS

P. Corradini, et al; The Structure of Poly(1–oxo–2–phenyltrimethylene): A Crystalline Alternating Styrene–Carbon Monoxide Copolymer; *Forschung: Chima* 44 No. 3 pp. 52–54 (1990).

M. Barsacchi, et al; Syndiotactic Poly(1–oxo–2–phenyltrimethylene): On the Mode of the Chain Growth under Palladium Catalysis; *Angew Chem. Int. Ed. Engl.* 30 No. 8 pp. 989–991 (1991).

E. Drent, et al; Efficient palladium catalysts for the copolymerization of carbon monoxide with olefins to produce perfectly alternating polyketones; *Journal of Organometallic Chemistry* 417, pp. 235–251 (1991).

G. F. Schmidt and Maurice Brookhart; Implications of Three–Center, Two–Electron M–H–C Bonding for Related Alkyl Migration Reactions: Design and Study of an Ethylene Polymerization Catalyst, *Journal of the American Chemical Society* 107 p. 1443 (1985).

Deeming et. al. Some Insertion Reactions of Platinum Hydrido–complexes with Hydrolysis of Pt–C σ–Bonds, J. C. S. Dalton, 1973, 1848–1852.

*Primary Examiner*—Shrive Beck
*Assistant Examiner*—Timothy H. Meeks
*Attorney, Agent, or Firm*—Bell, Seltzer, Park & Gibson

[57] ABSTRACT

A catalyst and method for the co-and terpolymerization of monomers of ethylene, other olefins, and alkynes with carbon monoxide is provided. Such a catalyst a method can be used for form living polymers. The catalyst of the present invention comprises an active cationic portion of the formula

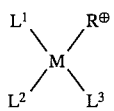

wherein M is a Group VIII metal, $L^1$ and $L^2$ are two electron donor ligands or are joined to form a bidentate four electron donor ligand, R is alkyl, aryl or acyl, and $L^3$ is CO or a ligand capable of being displaced by CO; and a non-coordinating anionic portion, soluble in inert solvents of the formula $$X_nG^-$$

wherein G is B, CH, N, $SO_3$, $SO_3CH$, $R_fSO_2CH$, or $NSO_2R_f$ wherein $R_f$ is $C_nF_{2+1}$ where n is 1 to 10 and X is F, $R_fSO_2$, $FSO_2$ or $C_6H_{(5-m)}Z_m$ wherein Z is F, Cl, a hydrocarbyl radical, substituted hydrocarbyl radical or combinations thereof, and m is from 1 to 5, and n of $X_n$ is from 1 to 4.

7 Claims, No Drawings

LATE TRANSITION METAL CATALYSTS FOR THE CO- AND TERPOLYMERIZATION OF OLEFIN AND ALKYNE MONOMERS WITH CARBON MONOXIDE

This application is a continuation of U.S. application Ser. No. 07/827,681, filed 29 Jan. 1992, now abandoned, which is a continuation-in-part of U.S. application Ser. No. 07/513,241, filed 20 Apr. 1990, now abandoned.

BACKGROUND OF THE INVENTION

The present invention relates to the co- and terpolymerization of monomers of ethylene, other olefins, and alkynes and mixtures thereof, with carbon monoxide, and more particularly to a polymerization catalyst for the same.

It is well known that ethylene and 1-olefins can be polymerized with a Ziegler-type catalyst derived from a transition metal halide and an aluminum alkyl. Ziegler-type catalysts, however, are rare when the transition metal is a late transition metal, such as a Group VIII metal. Also, aluminum alkyl is a pyrophoric liquid and hazardous to use.

In addition, in some early transition metal systems having a cationic species and an anionic species, there appears to be a reaction between the cationic species and the anionic species which deactivates the active cationic species, and more particularly the catalyst. Thus, attempts have been made to stabilize the active cationic species with a different anionic species. For example, it has been proposed in U.S. Pat. Nos. 4,791,180 to Turner and 4,794,096 to Ewen to use excess amounts of alumoxane with various active cationic Ziegler-type catalysts. These catalysts, however, typically require an undesirable excess of the alumoxane (i.e., greater than about 1:1000 weight ratio of catalyst to alumoxane). Moreover, these catalysts are highly subject to poisoning with basic impurities.

It has also been proposed in EPO Patent Nos. 0,277,003 and 0,227,004, both to Turner, to use an anionic species comprising a plurality of boron atoms to stabilize active cationic species based on zirconium, titanium or hafnium. However, the types of monomers and solvents which may be used with cationic species based on early transition metals is limited because of the incompatibility of these metals with monomers and solvents bearing functional groups.

Various catalysts to copolymerize carbon monoxide and olefins have been proposed. For example, a catalyst to copolymerize carbon monoxide and at least one olefinically unsaturated hydrocarbon has been proposed in U.S. Pat. Nos. 4,788,279 and 4,786,714, both to Drent. The catalyst is obtained by the reaction of a Group VIII metal compound with a nitrogen bidentate ligand, an anion of a non-hydrohalogenic acid having a pKa of less than 6 (e.g., sulfuric acid, perchloric acid, sulfonic acids and carboxylic acids), with or without an organic oxidant. However, polymers formed using such catalysts tend to have a wide and variable molecular weight distribution thus reducing the potential commercial utility thereof. Moreover, such catalysts tend to require more severe reaction conditions, e.g., high pressure and high temperatures.

Thus, it would be highly desirable to provide a catalyst for the co- and terpolymerization of monomers of ethylene, other olefins, and alkynes with carbon monoxide which is stable at a wide variety of temperatures, is resistant to impurities, is not hazardous to make and use, and is capable of being used with a wide variety of monomers and solvents including those with functional groups. It would also be desirable to provide a catalyst which provides a controlled molecular weight and a narrow molecular weight distribution of the polymer formed during the co- or terpolymerization process. Such a controlled molecular weight and narrow molecular weight distribution facilitates the tailoring of polymer properties such as melting point, glass transition temperature, crystallinity, etc.

SUMMARY

To this end, a catalyst and a method of co- and terpolymerizing monomers of ethylene, other olefins, and alkynes with carbon monoxide are provided by the present invention. In particular, the catalyst of the present invention comprises an active cationic portion of the formula

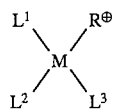

wherein M is a Group VIII metal, $L^1$ and $L^2$ are two electron donor ligands or are joined to form a bidentate four electron donor ligand, R is alkyl, aryl or acyl, and $L^3$ is CO or a ligand capable of being displaced by CO; and a non-coordinating anionic portion of the formula $$X_nG^-$$

wherein G is B, CH, N, $SO_3$, $R_fSO_2CH$, or $NSO_2R_f$ wherein $R_f$ is $C_nF_{2n+1}$ where n is 1 to 10, and X is F, $R_fSO_2$, $FSO_2$ or $C_6H_{(5-m)}Z_m$ wherein Z is F, Cl, a hydrocarbyl radical, substituted hydrocarbyl radical or combinations thereof, and m is from 1 to 5, and n of $X_n$ is from 1 to 4.

The present invention also includes the polymerizable mixture comprising the monomers of ethylene, other olefins and alkynes, carbon monoxide and the catalyst described above.

Co- and terpolymerization can be accomplished by contacting a monomer of ethylene, other olefins or alkynes and carbon monoxide with the catalyst. The present invention can be used to form a living polymer of carbon monoxide and the various olefins and alkynes. The term "living polymer" relates herein to a polymerization system wherein the catalyst is part of the polymer chain, and its activity remains even after polymerization has ended. Such a system can be used to produce polymers characterized by a controlled molecular weight and a narrow molecular weight distribution. Additionally, block copolymers can be formed by controlling the amount of the olefin monomers added. For example, a $[A—CO]_n$ $[B—CO]_m$ block copolymer can be formed by first catalyzing the co-polymerization of alkene B and carbon monoxide, and when alkene B has been consumed adding a predetermined amount of alkene A.

In one embodiment, the catalyst comprises an active cationic portion of the formula

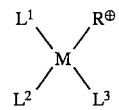

wherein M is palladium or nickel, $L^1$ and $L^2$ are two electron donor ligands or are joined to form a bidentate four electron donor ligand, R is alkyl, aryl or acyl, and $L^3$ is CO or a ligand capable of being displaced by CO; and a non-coordinating anionic portion of the formula

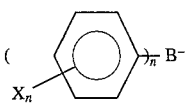

wherein X is F, Cl, hydrocarbyl radical, substituted hydrocarbyl radical, or combinations thereof, and n is from 1 to 5.

In another embodiment, the catalyst comprises an active cationic portion of the formula

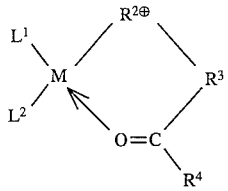

wherein M is palladium or nickel, $L^1$ and $L^2$ are 2-electron donor ligands or are joined to form a single 4-electron donor ligand, $R^2$ and $R^3$ are methylene units (—$CH_2$—) or substituted methylene units, and $R^4$ is an alkyl or aryl group, and a stabilizing, non-coordinating anionic portion of the formula

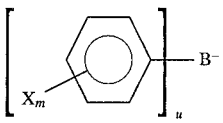

wherein X is F, Cl, a hydrocarbyl radical, substituted hydrocarbyl radical, or combinations thereof, and n is from 1 to 5.

DETAILED DESCRIPTION OF THE INVENTION

The present invention is directed to a catalyst for the co- and terpolymerization of monomers of ethylene, other olefins, or alkynes, with carbon monoxide. The catalyst includes an active cationic portion and an anionic portion which is soluble in a wide range of solvents.

The active cationic portion can have the formula

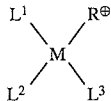

M is a late transition metal, and namely a Group VIII metal selected from the group consisting of iron, cobalt, nickel, ruthenium, rhodium, palladium, osmium, iridium and platinum. Preferred are palladium, platinum and nickel.

$L^1$ and $L^2$ are two electron donor ligands or are joined to form a bidentate four electron donor ligand. The ligands have center atoms bearing non-bonded electron pairs such as atoms of N, P, S and O and bearing H, alkyl, aryl and other groups which render $L^1$ and $L^2$ electronically neutral. For example, $L^1$ and $L^2$ can be a phosphine, e.g., $PR'_3$ wherein R' is a hydrocarbyl radical or a substituted hydrocarbyl radical, $P(OR'')_3$ wherein R'' is a hydrocarbyl radical or a substituted hydrocarbyl radical, or $PX'_3$ wherein X' is fluorine or chlorine; and R is H, a hydrocarbyl radical or a substituted hydrocarbyl radical as above.

$L^1$ and $L^2$ can be joined to form a bidentate four electron donor ligand by a bridging group selected from the group consisting of alkyl and aryl groups and substituted examples thereof. Specific examples include, but are not limited to, 2,2'-bipyridine, 1,10-phenanthroline, 1,2-bis(diphenylphosphino)ethane, 1,3-bis(diphenylphosphino)propane, 1,2-bis-(dimethylphosphino)ethane and bis(dimethylphosphino)methane.

R is alkyl, aryl or acyl, for example, and includes, but is not limited to, $CH_3$, $COCH_3$, $C_6H_5CO$ and $CH_3COCH_2CH\phi CO$ $L^3$ is CO or a ligand capable of being displaced by CO. Exemplary ligands include but are not limited to $H_2O$, RCN and ROH wherein R is alkyl or aryl, $C_6H_5Cl$, $CH_2Cl_2$, ketones (e.g., acetone), ethers (e.g., diethyl ether or tetrahydrofuran), and amines.

The cationic portion can also have the formula

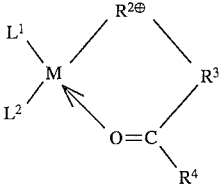

M is preferably palladium or nickel, $L^1$ and $L^2$ are as defined previously, $R^2$ and $R^3$ are methylene or substituted methylene units, and $R^4$ is an alkyl or aryl group.

The stabilizing anionic portion is non-coordinating and soluble in a wide variety of solvents. The anionic portion can have the formula $X_nG^-$ wherein G is B, CH, N, $SO_3$, $SO_3CH$, $R_fSO_2CH$, or $NSO_2R_f$ wherein $R_f$ is $C_nF_{2n+1}$ where n is 1 to 10 and X is F, $R_fSO_2$, $FSO_2$ or $C_6H_{(5-m)}Z_m$ wherein Z is F, Cl, a hydrocarbyl radical, substituted hydrocarbyl radical or combinations thereof, and m is from 1 to 5, and n of $X_n$ is from 1 to 4. Specific examples include but are not limited to $(CF_3SO_2)_2CH$, $(CF_3SO_2)_2N$ and $CH_3C_6H_4SO_3$. A preferred anionic portion is

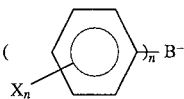

wherein X is F, Cl, hydrocarbyl radical, substituted hydrocarbyl radical, or combinations thereof, and n is from 1 to 5. A preferred anionic portion of this formula is tetrakis[3,5-bis(trifluoromethyl)phenyl] borate (i.e., X is $CF_3$ and n is 2).

The catalyst is prepared in a variety of ways, using techniques and precursors of the cationic and anionic portions commonly known to those skilled in the art. One method is to add the cationic portion precursor to a reaction vessel containing an appropriate solvent. The solvent should be able to dissolve the catalyst species, should be liquid at temperatures at which polymerization reactions are conducted, and the catalyst should be stable in the solvent. Suitable solvents are, for example, methylene chloride, benzene, toluene, chlorobenzene, methanol, diethyl ether and the like. The anionic portion precursor is then added to the reaction vessel. Usually, the anionic portion precursor is in its acid form. The acid form can be prepared by adding 1 equivalent of HCl to the sodium salt of the anionic portion precursor in diethyl ether. Typically, the ratio of cationic portion precursor to anionic portion precursor is 1:1.05. Preferably, the reaction is completed under dry, oxygen-free conditions using solvents dried under nitrogen by distillation from either Na/benzophenone or P$_2$O$_5$. It is usually preferred that the anionic portion precursor is added to the cationic portion precursor rather than in the reverse order.

The catalyst can be prepared directly in the solvent used for polymerization, as in the example described above, or the catalyst can be isolated free of solvent and stored in this state. In this application, the cationic portion precursor is dissolved in a solvent which is a weakly complexing material, such as acetonitrile, and is treated with a small excess of the acid form of the anionic portion precursor, also dissolved in acetonitrile or other solvent. After addition has been completed, excess solvent is removed at reduced pressure. The catalyst prepared in this way is dissolved in the polymerization solvent of choice just prior to its use.

The catalysts of the present invention are particularly useful in the co- and terpolymerization of carbon monoxide and monomers of ethylene; α-olefins such as propylene, 1-butene, 1-hexene and 1-octene; norbornylene, styrene and substitute styrenes, diolefins such as butadiene, 1,4-hexadiene, 1,5-hexadiene and 1,3-pentadiene; olefins having functional groups such as halides, esters, ethers, ketones, aldehydes, fluoroalkyls and aryls; and alkynes such as acetylene; and mixtures thereof.

The resulting co- and terpolymers have utility in a wide variety of polymer systems. For example, the co- and terpolymers can be used to facilitate the blending of other polymers (i.e., can be used as compatiblizers). The co- and terpolymers can be used in systems requiring a photodegradable polymer such as in thermoresist applications or for materials that photodegrade over an extended period. The co- and terpolymers can be used in systems requiring a high $T_g$ such as in high performance polymers. They can be used in systems requiring high crystallinity such as in high impact polymers.

In a preferred embodiment, the catalyst and method of the present invention can be used to form a living polymer of carbon monoxide and the various olefins and alkynes. The catalyst is part of the polymer chain, and its activity remains after polymerization has ended. Such a system can be used to produce polymers characterized by a controlled molecular weight and a narrow molecular weight distribution. The molecular weight distribution is typically defined as the polydispersity wherein $$\text{Polydispersity} = \frac{\text{weight average molecular weight } (\overline{M}_w)}{\text{number average molecular weight } (\overline{M}_n)}$$

This value is approximately equal to 1+(1/p) wherein p is the degree of polymerization. The value of the polydispersity will approach one as the degree of polymerization increases such as when a polymer system has a narrow molecular weight distribution indicative of living polymers. Thus, for example, polyketones (e.g., copolymer of 4-t-butylstyrene and carbon monoxide) can be formed having a narrow molecular weight distribution, namely a polydispersity ranging from about 1.03 to about 1.40.

The catalyst and method of the present invention can be used to form block copolymers by first catalyzing the co-polymerization of alkene B and carbon monoxide, and when alkene B has been consumed adding a predetermined amount of alkene A to form a copolymer having the general formula [A—CO]$_n$ [B—CO]$_m$.

Polymerizations are conducted by solution, slurry or gas phase processes at temperatures in approximately the range −20° C. to 150° C., under atmospheric, super-atmospheric or sub-atmospheric pressures of carbon monoxide (or other gases when the alkene is gaseous at the particular reaction temperature), and for periods of time ranging from 1 minute to 1000 hours. A polymerizable mixture is formed comprising the catalyst, the monomers to be co- or terpolymerized, and carbon monoxide. The solvent employed as the polymerization medium can be functionalized alkanes such as methylene chloride or chloroform, an ether such as diethyl ether, a ketone such as acetone or butanone, an alcohol such as methanol or ethanol, or an aromatic hydrocarbon such as chlorobenzene. Chlorobenzene and methylene chloride are preferred as the polymerization medium. Pigments, antioxidants, light stabilizers and other additives known to those skilled in the art may be added to the polymer. Polymerization can be controlled by exposure to acid, hydrogen gas or using other techniques of control commonly known to those skilled in the art.

EXAMPLES

The following examples are provided to further illustrate the invention and the various embodiments thereof but should not to be construed as limiting the scope thereof. All preparative manipulations were carried out using conventional Schlenk techniques, Fisher-Porter reactor techniques, Parr reactor techniques, or combinations of these techniques. Materials which were demonstrated to be sensitive to oxygen, as is the case with certain of the nickel precursors, were handled in a Vacuum Atmospheres drybox. Dichloromethane was distilled from P$_2$O$_5$ in an atmosphere of N$_2$, acetonitrile was used as obtained from Burdick & Jackson of Muskegon, Mich. without further purification and without exclusion of air, and chlorobenzene was used as supplied by Aldrich Co. of Milwaukee, Wis. Carbon monoxide was used as supplied by Matheson (C.P. Grade), ethylene-CO was used as supplied by Alphagaz (1:1 molar ratio of CO to ethylene), and various alkenes were used as obtained from suppliers, without further purification.

The polymeric products were isolated in various ways, depending upon physical properties of the polymer in question. For example, highly crystalline, highly insoluble materials such as poly(ethylene-CO) and poly(styrene-CO) were separated from the reaction mixture by suction filtration and washed several times with methanol, then dried overnight in high vacuum. Chlorobenzene-soluble polymers such as poly(4-tert-butylstyrene-CO) were precipitated by pouring the chlorobenzene solution of the polymer into a blender containing methanol or hexane, isolating the solid polymer by suction filtration or by centrifugation where necessary, and washing the polymer several times with methanol and drying overnight in vacuo.

Polymeric products were analyzed by $^1$H NMR and $^{13}$C NMR spectroscopy, using appropriate solvents, including CD$_2$Cl$_2$, CDCl$_3$, and CF$_3$COOD, and by infrared spectroscopy. Molecular weights were determined by gel permeation chromatography. Physical properties such as melting point and glass-transition temperature were determined by thermal gravimetric analysis/differential scanning calorimetry.

Examples 1–3 describe the preparation of catalysts which are useful in the process of this invention. In all three cases, co-polymerization of alkenes with CO were subsequently demonstrated.

Example 1

2,2'-Bipyridinedimethylpalladium (29.2 mg, 0.10 mmol) was dissolved in 10.0 mL acetonitrile which had not been freed of O$_2$, and while this solution was gently stirred, a solution of 10.0 mL acetonitrile and 110 mg (0.11 mmol) diethyloxonium tetrakis[3,5-bis(trifluoromethyl)phenyl]borate was added dropwise over a 10 minute period. After addition had been completed, the excess acetonitrile was removed at reduced pressure, to provide a quantitative yield of the catalyst comprising a I-bipy cationic portion and a tetrakis[3,5-bis(trifluoromethyl)phenyl]borate anionic portion.

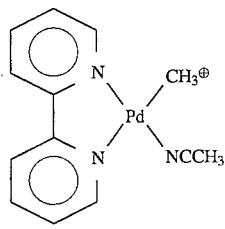

I-bipy

The structure of the complex I-bipy/tetrakis[3,5-bis(trifluoromethyl)phenyl]borate was confirmed by $^1$H NMR spectroscopy.

Example 2

1,10-Phenanthrolinedimethylpalladium (31.6 mg, 0.10 mmol) was dissolved in 10.0 mL acetonitrile, and while this solution was stirred with a magnetic stirrer, a solution of 10.0 mL acetonitrile containing 110 mg (0.11 mmol) diethyloxonium tetrakis[3,5-bis(trifluoromethyl)phenyl] borate was added over a 10 minute period. After addition had been completed, the excess acetonitrile was removed at reduced pressure, to provide a quantitative yield of the catalyst having a I-phen cationic portion and a tetrakis[3,5-bis (trifluoromethyl)phenyl]borate anionic portion.

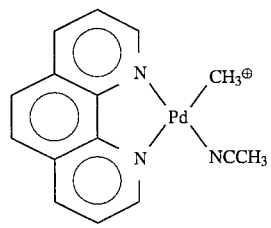

I-phen

The structure of the complex I-phen/tetrakis[3,5-bis(trifluoromethyl)phenyl]borate was confirmed by $^1$H NMR spectroscopy, and by elemental analysis.

Example 3

1,2-(diphenylphosphino)ethanedimethylnickel (48.3 mg, 0.10 mmol) was dissolved in 10.0 mL acetonitrile, and to this stirred solution was added, over a 10 minute period, a solution made up of 10.0 mL acetonitrile and 110 mg (0.11 mmol) diethyloxonium tetrakis[3,5-bis(trifluoromethyl) phenyl]borate. The excess acetonitrile was removed at reduced pressure to provide the catalyst having a I-diphos cationic portion and a tetrakis[3,5-bis(trifluoromethyl)phenyl]borate portion as a glassy, solid residue.

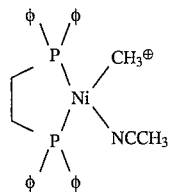

I-diphos

The structure of the complex I-diphos/tetrakis[3,5-bis(trifluoromethyl)phenyl] borate was confirmed by $^1$H NMR spectroscopy.

Example 4

This example was conducted to determine whether the polymerization is a living polymer system.

The catalyst was prepared as in Example 2 except the amounts were doubled. The excess CH$_3$CN was removed in vacuo and the catalyst thus produced was transferred in 80 mL chlorobenzene under N$_2$ to a Fisher-Porter reactor. 4-t-butylstyrene (20 g) was introduced, and the N$_2$ atmosphere carefully replaced with CO, then the CO pressure was increased to 40 lbs. Samples were periodically taken by reducing the gas pressure to just above 1 atm, removing a 2–5 mL sample, and repressurizing the system to 40 lbs. Except for the earliest samples, which were isolated by removal of all volatile materials by applying high vacuum, polymer samples were isolated by precipitation from methanol, washing with methanol, and drying in vacuo.

Progress of the reaction was monitored by $^1$H NMR spectroscopy, by integration of isolated vinyl absorptions of the unreacted styrene and comparing those values with the ΦC$\underline{H}$ and two diastereomeric C$\underline{H}_2$ protons of the copolymer, prior to isolation of the polymeric products.

The Table below shows percent conversion of starting styrene to polymer, number-average molecular weight for each polymer sample, weight-average molecular weight for each polymer sample, and the calculated polydispersity.

| Sample | Percent Conversion | $\bar{M}W_n$ | $\bar{M}W_w$ | Polydispersity |
|---|---|---|---|---|
| 1 | 7.4 | 9730 | 10052 | 1.03 |
| 2 | 19.9 | 24558 | 25509 | 1.04 |
| 3 | 27.4 | 29512 | 32185 | 1.09 |
| 4 | 39.5 | 40630 | 44419 | 1.09 |
| 5 | 45.2 | 42094 | 46847 | 1.11 |
| 6 | 48.0 | 44996 | 50105 | 1.11 |
| 7 | 52.5 | 53292 | 59660 | 1.20 |
| 8 | 61.1 | 56050 | 62193 | 1.11 |
| 9 | 62.4 | 56419 | 63957 | 1.13 |
| 10 | 84.5 | 72166 | 82550 | 1.14 |

The reaction was discontinued after 155 hours. The product was identified by $^1$H NMR spectroscopy as the polymer with the following repeating unit.

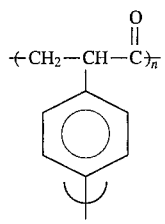

A plot of percent conversion vs $\bar{M}W_n$ is linear. This data together with the low polydispersity (e.g., 1.03 to 1.14) indicates that the polymerization reaction is an example of living polymerization.

Example 5

Example 4 was repeated except that the reaction was terminated after about 93 hours. The polydispersity of eleven samples taken throughout the experiment showed a low polydispersity range of 1.04 to 1.08 indicating living polymerization.

Example 6

The catalyst of Example 2 was redissolved in 40 mL dry chlorobenzene in a 50% ethylene/CO atmosphere. The reaction temperature was varied between ambient (25° C.) and 55° C. over the course of the reaction. The reaction was discontinued after 49 hours although gas absorption was still being observed. The solid polymeric material was isolated by suction filtration, washed several times with $CH_2Cl_2$, and dried in vacuo to give 1640 mg of a nearly white powder.

Example 7

The catalyst of Example 1 was redissolved in chlorobenzene (40 mL) in a CO atmosphere, and 5 mL styrene (stabilized with 4-t-butyl catechol) was added. The reaction was discontinued after 21.5 hours, the solid polymeric product isolated by centrifugation followed by washing with diethyl ether, and drying in vacuo. In this way, 2000 mg of light-grey, powdery product was obtained. The $^1H$ NMR spectrum (in $CF_3COOD/CD_2Cl_2$) showed the expected alternating ethylene-CO copolymer.

Example 8

The catalyst of Example 2, was dissolved in 40 mL chlorobenzene in a nitrogen atmosphere, and the $N_2$ was carefully replaced with CO by evacuating the system and replenishing the gaseous atmosphere with CO, repeating the process three times. 4-t-butylstyrene (7.0 g, 44 mmol) was injected into the stirred solution, and reaction progress was monitored by measuring CO uptake. After 23 hours of reaction under 1 atm CO pressure, the reaction mixture was absorbing 0.5 mL CO/10 minutes. At this time, 3.5 g (22 mmol) additional 4-t-butylstyrene was added to essentially double the rate of reaction (i.e., CO uptake was measured at 1.1 mL/10 minutes). After 42 hours total reaction time, the reaction mixture was filtered through Celite filter aid, then added to well-stirred methanol (500 mL). The solid obtained in this way was collected by suction filtration, the residue washed with methanol and dried overnight in high vacuum. The white, powdery solid product weighed 6.0 g. Example 8 demonstrates that the reaction is directly dependent on the concentration of the alkene.

Example 9

Example 8 was repeated except the amount of 4-t-butylstyrene, was doubled, as was the solvent volume. During the course of the reaction, samples were removed, polymeric material isolated, and the polymers analyzed by gel permeation chromatography. Isolation of later fractions was accomplished by precipitation from methanol; early fractions, because of low molecular weight and high solubility, were isolated simply by removal of solvent under high vacuum. In the table below, reaction times, number-average and weight-average molecular weights, and polydispersity for each sample are shown.

| Sample | Reaction Time (hrs) | $\overline{MW}_n$ | $\overline{MW}_w$ | Polydispersity |
| --- | --- | --- | --- | --- |
| 1 | 16 | 26,544 | 29,155 | 1.10 |
| 2 | 24 | 43,300 | 49,568 | 1.14 |
| 3 | 40 | 53,534 | 68,188 | 1.27 |
| 4 | 47 | 58,358 | 74,194 | 1.27 |
| 5 | 64 | 64,105 | 82,758 | 1.29 |

The low polydispersity range indicates living polymerization. An IR spectrum obtained on sample 5 showed a carbonyl stretching frequency at 1708 $cm^{-1}$. A differential scanning calorimetry experiment conducted on sample 5 provided a glass transition temperature, $T_g$, of 158° C.

Example 10

The catalyst of Example 1 was redissolved in 40 mL chlorobenzene in a CO atmosphere, followed immediately by the addition of 10 mL (8.97 g) of 97% 4-methylstyrene (the 3% impurity was the 3-methylstyrene isomer). After 23 hours of reaction time, heavy grey precipitate of polymeric material was observed, and stirring of the mixture was labored. Additional chlorobenzene (20 mL) was introduced to facilitate stirring. The reaction was discontinued after 25 hours. The reaction was worked up by addition of about 30 mL of methanol, then separating the mixture by centrifugation, and washing the solid residue with methanol, finally drying the grayish powdery material in vacuo to yield 7.35 g of product. NMR data ($^1H$ NMR and $^{13}C$ NMR spectra) were compatible with the expected structure of the material.

Example 11

The catalyst of Example 1 was redissolved in 40 mL chlorobenzene in a CO atmosphere, followed immediately by the addition of 10 mL of a mixture of methylstyrenes made up of 67% 3-methylstyrene and 33% 4-methylstyrene (composition assigned on the basis of $^1H$ NMR spectrum). In comparison with the same reaction involving 4-methylstyrene only the reaction in the present case was remarkably slower, indicating that 3-methylstyrene did not react as readily as did the 4-isomer. Furthermore, a precipitate was not observed; rather, the material formed a gel, after about 23 hours, which was not deformed by changes in the direction of lines of gravity. Additional chlorobenzene (20 mL) was added in order to render the mixture more mobile, without useful effect. The reaction was therefor discontinued. The 6.0 g yield of polymer, isolated after physically mixing the gel described above with 30 mL methanol and collecting by suction filtration, then washing with methanol and drying in vacuo, was powdery and nearly white in color. The lower yield of this material is compatible with the earlier observation, based on rate of gas absorption, that 4-isomer of methylstyrene is more reactive than the 3-isomer.

Example 12

Double amount of catalyst of Example 1 was dissolved in 80 mL chlorobenzene (degassed) in an atmosphere of 50% ethylene/CO, and this solution was transferred to a Fisher-Porter apparatus for elevated-pressure reaction. The gas mixture was passed through a BASF catalyst at 40° C., and through activated 4A molecular sieves, to remove $O_2$ and $H_2O$ which may have contaminated the ethylene/CO mixture. Ethylene/CO pressure was increased to 30 psi, and the reaction allowed to proceed with stirring for 23 hours. The product was isolated in the usual way, by suction filtration, methanol washing, and drying in vacuo, to provide 1.61 g of light-grey, granular solid.

Example 13

The catalyst of Example 2 was redissolved in 40 mL chlorobenzene and transferred to a Fisher-Porter apparatus under 50% ethylene/CO (the gas mixture was purified in the manner described in Example 12. The system was pressurized with 50% ethylene/CO to 40 psi, and reaction allowed to proceed at room temperature for 41 hours, at which point it was discontinued. The solid residue was collected by suction filtration, washed with methanol and dried in vacuo, to give 1.41 g of nearly white polymer.

Example 14

The reaction was conducted as described in Example 13, with the single exception that styrene (5.0 mL) was introduced just prior to pressurization to 40 psi with 50% ethylene/CO. Reaction was allowed to proceed at room temperature, and the reaction solution became more viscous as reaction continued. After 26 hours, the reaction mixture was filtered to remove traces of dark residue, then the reaction solution was poured into 300 mL $CH_3OH$ in a rapidly-stirred blender. The ropey material which separated was gathered, redissolved in dichloromethane, and reprecipitated from 300 mL $CH_3OH$ as before. The elastic material was dried in vacuo to give a tough, elastic material. The $^1H$ NMR spectrum suggested an ethylene/styrene molar ratio of about 1.5:1. Gel permeation chromatographic analysis of this material showed it to have a number-average molecular weight of 41,990 and a weight-average molecular weight of 44,036, to give a polydispersity of 1.05.

Example 15

The catalyst of Example 1 was redissolved in 40 mL chlorobenzene in a 50% ethylene/CO atmosphere, 5 mL styrene introduced, and the ethylene/CO pressure increased to 40 lbs for the reaction's duration. After 45 hours, the reaction mixture was poured into about 300 mL $CH_3OH$ stirred rapidly in a blender. In this way, 4.9 g of a tough, fibrous material was obtained.

Gel permeation chromatography of a sample of this material showed a number-average molecular weight of 44,337, and a weight average molecular weight of 51,540, to produce a polydispersity of 1.16 indicative of a living polymer.

Example 16

The catalyst employed in this experiment was prepared from 32 mg (0.1 mmol) (4,4'-dimethyl-2,2'-bipyridine)palladium$(CH_3)_2$ and 106 mg (slightly in excess of 0.1 mmol) diethyloxonium tetrakis[3,5-bis(trifluoromethyl)phenyl]borate in 20 mL $CH_3CN$. Removal of excess acetonitrile in vacuo, and redissolving the residue in 40 mL chlorobenzene in a CO atmosphere, then injecting 5 mL of a 2:1 mixture of 3-methyl and 4-methylstyrenes and allowing the reaction to proceed at ambient temperature and atmospheric pressure resulted in the production of 5.84 g of a brittle yellowish polymeric product.

Examples 17–22 demonstrate preparing the catalyst in the presence of one of the monomers to be copolymerized.

Example 17

1,2-(diphenylphosphino)ethanedimethylpalladium (75 mg, 0.14 mmol) was dissolved in 15 mL dichloromethane (distilled in $N_2$ atmosphere from $P_2O_5$), and the solution was saturated with ethylene. This solution was treated with 15 mL of $CH_2Cl_2$ containing 145 mg (0.14 mmol) of diethyloxonium tetrakis [3,5-bis(trifluoromethyl)-phenyl]borate, similarly saturated with ethylene. The feed gas was changed to 50% ethylene/CO, and allowed to proceed for 15 hours. Grey polymeric material (90 mg), identified as ethylene/CO copolymer, was obtained.

Example 18

2,2'-Bipyridinedimethylpalladium (39 mg, 1.34 mmol) in 10 mL chlorobenzene in a propylene atmosphere was treated with 135 mg (1.33 mmol) diethyloxonium tetrakis[3,5-bis(trifluoromethyl)phenyl]borate in 10 mL chlorobenzene, also saturated with propylene. Propylene uptake was monitored over about 50 minutes; at this point, CO was introduced at about the same rate as propylene flow. After 2.5 hours, temperature was increased from 25° C. to 40° C. Reaction was discontinued after 5 hours, the reaction mixture filtered to remove some dark residue, and the solvent removed at reduced pressure. A viscous orange oil (210 mg) was obtained whose $^1H$ NMR spectrum showed absorptions between δ3.3 and δ0.8, and whose IR spectrum showed a substantial absorption at 1708 $cm^{-1}$ attributable to aliphatic carbonyl which would be present in the expected polymeric structure.

Example 19

2,2'-Bipyridinedimethylpalladium (29.2 mg, 0.1 mmol) in 10 mL $CH_3OH$ (distilled from $Mg/I_2$ under $N_2$, then degassed by the freeze-thaw method) was treated with a solution of 10 mL of the same $CH_3OH$ containing 101 mg (0.1 mmol) diethyloxonium tetrakis[3,5-bis(trifluoromethyl)phenyl]borate in an ethylene atmosphere. After it was ascertained that ethylene uptake was occurring, the feed gas was switched to 50% ethylene/CO. Gas uptake was monitored over a 165 minute period, and the reaction was discontinued at this point. The dark grey polymeric material was isolated by filtration, washed with diethyl ether, and dried in vacuo to provide 285 mg of the polymeric material.

Example 20

The reaction procedure described in Example 19 was followed, except that diethyl ether, degassed by freeze-thaw method, was employed as the solvent. The reaction was continued for 21 hours, at which point the polymer was collected by suction filtration, washed with diethyl ether, and dried in vacuo to yield 700 mg of a light grey powder.

Example 21

2,2'-Bipyridinedimethylpalladium$_2$ (29 mg, 0.1 mmol) was dissolved in 10 mL $CH_2Cl_2$ containing 0.5 mL $CH_3CN$ (the solvent was carefully degassed by the freeze-thaw method). This solution was treated with 10 mL $CH_2Cl_2$ containing 101 mg (0.1 mmol) diethyloxonium tetrakis[3,5-bis(trifluoromethyl)phenyl]borate. After stirring the solution for about 5 minutes, the solvent was removed at reduced pressure to provide an orange-red glassy solid material. This was redissolved in 20 mL chlorobenzene in an ethylene atmosphere, and after three minutes the atmosphere was replaced with a 50% ethylene/CO mixture. Reaction was discontinued after 19 hours, although gas absorption was still continuing at a reduced rate. The solid product was collected by suction filtration, then washed with $CH_2Cl_2$ and dried in vacuo to give 1.12 g of a light-grey powdery material.

Example 22

The reaction described in Example 21 was repeated, except that the solvent was dichloromethane ($CH_2Cl_2$) instead of chlorobenzene. The rate of gas absorption was about the same, and the yield was only slightly lower 1.0 g of a darker grey powdery material.

Example 23

In Example 23, it is demonstrated that the catalyst may be pre-formed in an inert atmosphere such as $N_2$, stored indefinitely as a glassy solid, and dissolved in chlorobenzene in the atmosphere of the reaction.

The catalyst of Example 1 was redissolved in 20 mL chlorobenzene (degassed by freeze/thaw method) in a 50% ethylene/CO atmosphere. Gas uptake was monitored and was about the same rate as seen in previous examples. Reaction was discontinued after 20 hours; 1.04 g of a light-grey powdery material was obtained.

Example 24

2,2'-Bipyridinedimethylnickel (24,5 mg, 0.1 mmol) complex was dissolved in 10 mL degassed $CH_3CN$, and 101 mg (0.1 mmol) of diethyloxonium tetrakis[3,5-bis (trifluoromethyl)phenyl]borate in 10 mL $CH_3CN$ was added. After addition was complete, excess acetonitrile was removed in vacuo to produce a bright yellow, glassy material which began to crystallize. This material was redissolved in degassed $CH_2Cl_2$ (20 mL) in a 50% CO/ethylene atmosphere. The reaction was discontinued after 5 hours, since gas absorption had almost ceased. The solid residue which had formed was collected by suction filtration, washed with methylene chloride, and dried in vacuo to provide 142 mg of a pale greenish solid. The IR spectrum of this material showed a carbonyl absorption expected for the ethylene/CO copolymer.

Example 25

The catalyst of Example 2 was redissolved in 80 mL chlorobenzene, the solution was transferred to a Fisher-Porter apparatus, and 20 mL styrene was added. The solution was cooled in an ice bath, and propylene was introduced until a definite volume change was noted. The Fisher-Porter apparatus was closed and pressurized to 40 lbs with CO.

After 20 hours, the reaction mixture was cooled to 0° C., and more propylene was introduced in the manner described previously. The system was repressurized to 40 lbs, and allowed to react for an additional 24 hours, then discontinued. Polymeric product was precipitated by addition of the reaction mixture to rapidly stirred methanol. After drying in vacuo, 7.0 g of a granular, off-white solid was obtained. $^1H$ NMR spectra suggest a styrene-propylene ratio of about 3 to 1.

Example 26

The catalyst of this example was prepared from 36.1 mg (0.1 mmol) [5-nitro-1,10-phenanthroline] dimethylpalladium and 106 mg of diethyloxonium tetrakis[3,5-bis(trifluoromethyl)Phenyl] borate, in 20 mL $CH_3CN$. Evaporation of excess acetonitrile at reduced pressure produced a brownish, glassy residue which was redissolved in 40 mL chlorobenzene under CO atmosphere, and treated with 5 mL 4-t-butylstyrene. The reaction was allowed to proceed for 48 hours. Workup of the reaction mixture involved pouring into rapidly stirred methanol, filtration of the precipitate, and drying in vacuo, to give 3.12 g of copolymer.

In a control reaction which was run alongside the 5-nitro-1,10-phenanthroline dimethylpalladium catalyzed copolymerization, in order to ascertain the effect of the $-NO_2$ group, 1,10-phenanthrolinedimethylpalladium was used. No other modifications were made. From this control reaction, 2.83 g of copolymer was obtained. Thus the reactions took place at about the same rate, and the effect of the $-NO_2$ group in the bidentate ligand is not large.

Example 27

The catalyst of Example 2 was transferred to a Fisher-Porter apparatus in 40 mL chlorobenzene under CO atmosphere, 20 g norbornylene in 20 mL chlorobenzene was added, the CO pressure was increased to 40 lbs, and the temperature of the system was raised to 50° C. for one hour, then to 60° C. for the remainder of the reaction. The reaction was discontinued after 95 hours; the reaction mixture was filtered to remove a small amount of black residue, and the polymer precipitated by pouring into 300 mL well-stirred methanol. The white solid was collected by centrifugation, washed with methanol, and dried in vacuo to yield 6.6 g of a white powder, soluble in chloroform and dichloromethane, whose $^1H$ NMR spectrum was compatible with the expected structure for the product.

Example 28

[2,2'-Bipyridine)methylpalladium($CH_3CN$)]+ [$(CF_3SO_2)_2CH$]$^-$ was prepared from 29.2 mg (0.1 mmol) 2,2'-bipyridinedimethylpalladium and 30 mg $(CF_3SO_2)_2CH_2$ in 20 mL $CH_3CN$, then removing the excess $CH_3CN$ by evaporation in vacuo. This material was redissolved in 40 mL chlorobenzene in a CO atmosphere, followed by addition of 10 mL of a 3:1 mixture of 3-methylstyrene and 4-methylstyrene. Reaction was discontinued after 21 hours, at which point the reaction mixture was a very viscous, gel-like material. This was transferred to rapidly stirred methanol (500 mL), and the precipitate thus produced collected by suction filtration. After drying the solid product in high vacuum, the grayish powdery solid weighed 3.0 g.

Example 29

This example demonstrates the synthesis and application of the catalyst [2,2'-Bipyridinedimethylpalladium ($CH_3CN$)] tetrakis[3,5-bis(trifluoromethyl)phenyl] borate generated without the use of the acid diethyloxonium tetrakis [3,5-bis(trifluoromethyl)phenylborate].

2,2'-Bipyridinedimethylpalladium (58.4 mg, 0.2 mmol) was dissolved in 20 mL degassed $CH_2Cl_2$, and the solution was cooled to 0° C. in an ice bath. Then 32 mg $Br_2$ (0.2 mmol) in $CH_2Cl_2$ was introduced slowly. After addition was complete, the solution was stirred at 0° C. for two hours, and the solvent was removed at reduced pressure at 0° C. After all solvent had been removed, the product was a microcrystalline, earth-yellow solid.

The material was redissolved in 30 mL degassed $CH_2Cl_2$, and a solution of 220 mg (8% excess) of sodium tetrakis[3, 5-bis(trifluoromethyl)phenyl]borate in 10 mL $CH_2Cl_2$, containing 100 mg $CH_3CN$, was introduced at once at room temperature. After three hours, the mixture was filtered to remove separated solid, and the solvent was evaporated to provide a yellow, pasty solid.

This material was redissolved in 40 mL chlorobenzene in an atmosphere of CO, 10 mL styrene was added, and the reaction allowed to proceed (in CO atmosphere) for 24 hours. Workup by centrifugation, and washing of the solid thus collected with methanol followed by drying in vacuo, provided 4.1 g of grey polymeric material.

That which is claimed is:

1. A polymerization catalyst for the co- and terpolymerization of monomers of ethylene, other olefins and alkynes with carbon monoxide said catalyst comprising an active cationic portion of the formula

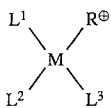

wherein M is palladium or nickel;

$L^1$ and $L^2$ are two electron donor ligands or are joined to form a bidentate four electron donor ligand, R is alkyl, aryl, or acyl, and $L^3$ is CO or a ligand capable of being displaced by CO; and a non-coordinating anionic portion of the formula

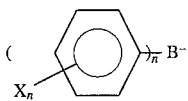

wherein X is F, Cl, hydrocarbyl radical, halo substituted hydrocarbyl radical, or combinations thereof, and n is from 1 to 5.

2. A polymerization catalyst according to claim 1 wherein said $L^1$ and $L^2$ are covalently joined by a bridging group selected from the group consisting of alkyl and aryl.

3. A polymerization catalyst according to claim 1, wherein the bidentate 4-electron donating ligand is selected from the group consisting of 2,2'-bipyridine and 1,10-phenanthroline.

4. A polymerization catalyst for the co- and terpolymerization of ethylene, other olefins and alkynes with carbon monoxide said catalyst comprising an active cationic portion of the formula

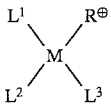

wherein M is palladium or nickel;

$L^1$ and $L^2$ are two-electron donor ligands or are joined to form a bidentate four-electron donor ligand;

R is alkyl, aryl or acyl, and $L^3$ is CO or a ligand capable of being displaced by CO which is selected from the group consisting of $H_2O$, $CH_3CN$, $CH_3CH_2CN$, $CH_3OH$, $C_6H_5Cl$, $(CH_3CH_2)_2O$, and $CH_2Cl_2$; and a non-coordinating anionic portion of the formula

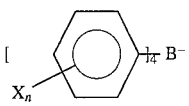

wherein X is F, Cl, hydrocarbyl radical, halo substituted hydrocarbyl radical or combinations thereof, and n is from 1 to 5.

5. A polymerization catalyst for the co- and terpolymerization of ethylene, other olefins and alkynes with carbon monoxide, said catalyst comprising an active cationic portion of the formula

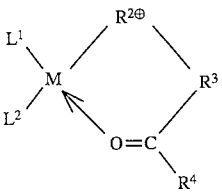

wherein M is palladium or nickel;

$L^1$ and $L^2$ are two-electron donor ligands or are joined to form a bidentate four-electron donor ligand;

$R^2$ and $R^3$ are methylene units; and $R^4$ is alkyl or aryl; and a stabilizing, non-coordinating anionic portion of the formula

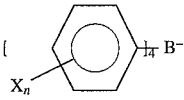

wherein X is F, Cl, hydrocarbyl radical, halo substituted hydrocarbyl radical or combinations thereof, and n is from 1 to 5.

6. A polymerization catalyst according to claim 5, wherein $L^1$ and $L^2$ are covalently joined by a bridging group selected from the group consisting of alkyl and aryl.

7. A polymerization catalyst according to claim 5, wherein said bidentate four-electron donor ligand is selected from the group consisting of 2,2-bipyridine and 1,10-phenanthroline.

* * * * *